June 26, 1951
C. W. MERTZ ET AL
2,558,221
OXIDATION OF MERCAPTANS
Filed April 28, 1949
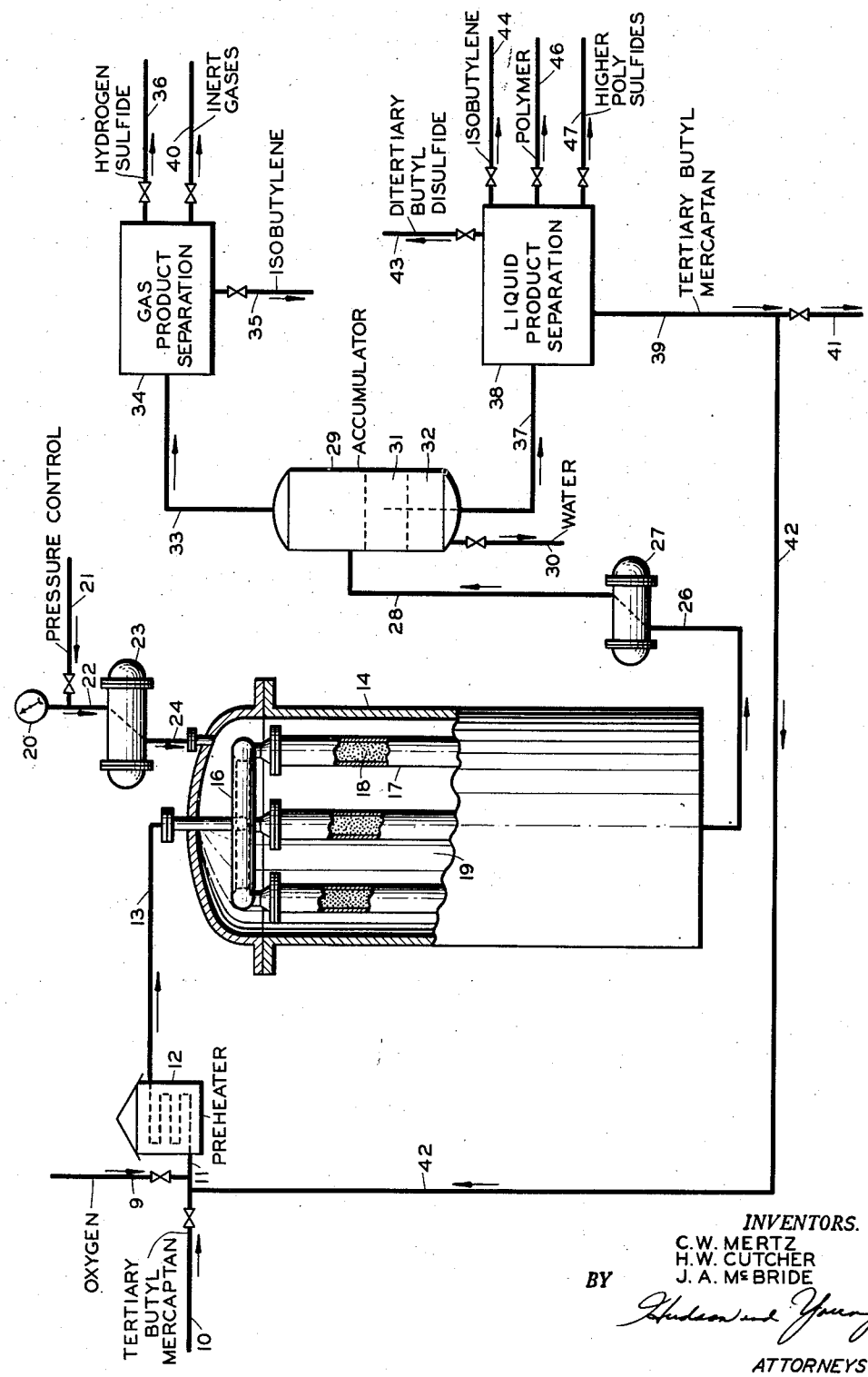
INVENTORS.
C. W. MERTZ
H. W. CUTCHER
J. A. McBRIDE
BY
ATTORNEYS

UNITED STATES PATENT OFFICE 2,558,221

OXIDATION OF MERCAPTANS

Clyde W. Mertz and Haskell W. Cutcher, Borger, and John A. McBride, Phillips, Tex., assignors to Phillips Petroleum Company, a corporation of Delaware Application April 28, 1949, Serial No. 90,222

9 Claims. (Cl. 260—608)

This invention relates to the manufacture of organic sulfides. In one aspect this invention relates to the oxidation of mercaptans. In another aspect this invention relates to the oxidation of tertiary mercaptans, to the corresponding sulfides.

The oxidation of mercaptans in gasoline to disulfides has long been practiced in the petroleum industry as a means of improving the quality of the product, and is often referred to as "sweetening." The well-known sweetening processes are the "doctor" treatment and the "copper-sweetening" method. However, mercaptan oxidation methods of the kind employed for gasoline sweetening provide for oxidation of mercaptans present in low concentrations in the gasoline, as for example 0.01 to 0.03 per cent, and are not suitable for the commercial production of disulfides by mercaptan oxidation, in a practical manner. Also, the disulfides produced are not readily recovered in a suitable form.

This invention is concerned with the oxidation of alkyl mercaptans of any desired mercaptan purity to produce the corresponding alkyl sulfide, particularly the disulfide.

An object of this invention is to provide a process for the production of an organic sulfide.

Another object is to provide for the oxidation of a mercaptan to a corresponding sulfide.

Another object is to provide a novel catalyst for the oxidation of a mercaptan to a corresponding sulfide.

Another object is to provide for the oxidation of a tertiary mercaptan present in a mercaptan-containing stock, in any desired concentration, to a corresponding sulfide.

Another object is to provide for the catalytic oxidation of tertiary-alkyl mercaptans containing not more than 6 carbon atoms per molecule to produce corresponding sulfides.

Still another object is to provide for the catalytic oxidation of a tertiary-alkyl mercaptan containing not more than 6 carbon atoms in the molecule, to the corresponding tertiary-alkyl disulfide.

It is yet another object to provide for the catalytic oxidation of tertiary-butyl mercaptan to di-tertiary-butyl disulfide.

Other objects will be apparent, to one skilled in the art, from the accompanying discussion and disclosure.

In accordance with one embodiment of this invention a tertiary-alkyl mercaptan, preferably containing not more than 6 carbon atoms in the molecule, is oxidized, in any desired concentration, with free oxygen of any desired oxygen purity, to a corresponding sulfide, particularly the disulfide, in the presence of a selected naturally occurring bauxite, as a catalyst. We have found that the oxidation step of our invention may be conducted in the presence of a bauxite, as a catalyst, described more fully hereafter, over a temperature range of 150 to 450° F., although more preferably we employ a temperature within the limits of 275 to 350° F. A pressure of from one atmosphere to as high as from 800 to 1000 p. s. i. g. or higher, if desired, may be advantageously employed, although sub-atmospheric pressures may be utilized. In carrying out the process of our invention, we prefer usually to admit oxygen into the catalyst zone in a mole ratio to mercaptan, preferably within the limits of 0.06:1 to 0.25:1, and to introduce the mercaptan into the catalyst zone at a space velocity within the range of 0.25 to 1.0 volume per catalyst volume per hour, based on liquid volumes of mercaptan in the mercaptan-containing stock. We can oxide mercaptans in accordance with our invention, either in the liquid or vapor phase, but the reaction is preferably carried out in vapor phase.

We have found in many instances of operation of the process of our invention that a threshold temperature exists above which an unduly large amount of mercaptan decomposition occurs, producing hydrogen sulfide and the corresponding olefin, together with some polymer. It is therefore usually advantageous to control the reaction temperature to prevent development of temperatures above such a threshold value. In many instances the threshold temperature of oxidation and decomposition are quite close, and consequently close control of the temperature is desirable. At the lower conversion levels the need for close temperature control is of course considerably lessened, since a smaller quantity of exothermic heat of reaction is liberated.

Our invention is especially well applied to the oxidation of alkyl mercaptans containing preferably not more than 6 carbon atoms; our invention is perhaps most advantageously applied to the oxidation of tertiary-alkyl mercaptans, which are potentially more resistant to direct oxidation to a disulfide than are primary or secondary mercaptans.

In the following description one method of operating our process will be specifically disclosed. The figure is a diagrammatic illustration of one form of apparatus in which our process may be practiced. It is to be understood that the flow diagram is diagrammatic only and may be altered in many respects, by those skilled in the art, and yet remain within the intended scope of our invention.

Referring to the figure, tertiary-butyl mercaptan of about 90 to 95 per cent mercaptan purity from line 10, is passed into line 11 and admixed therein with commercial grade free-oxygen, i. e., 90 to 95 per cent oxygen purity, from line 9 in a mole ratio of oxygen to tertiary-butyl mercaptan within the limits of 0.06:1 to 0.25:1. The resulting mercaptan-oxygen admixture is passed from line 11 into preheater 12 and heated to about 275° F., and vaporized. Preheated mercaptan-oxygen mixture from zone 12 is passed through line 13 into header 16 in reaction chamber 14. Chamber 14 comprises an arrangement of apparatus for conducting the catalytic oxidation reaction of this invention in a manner to efficiently remove exothermic heat of reaction so as to prevent the development of unduly high reaction temperatures and "hot spots." In a preferred arrangement as illustrated in the figure, vaporous charge from line 13 is passed into a header 16, connected to and in communication with a plurality of catalyst tubes 17 packed with a novel catalyst of this invention, 18. Liquid heat transfer medium 19, preferably water, is maintained at a boiling temperature in direct contact in chamber 14 with catalyst tubes 17. Reaction temperature in catalyst tubes 17 is regulated by a choice of boiling temperature of heat transfer medium 19, which in turn is controlled by the pressure imposed on the boiling heat transfer liquid. Heat is supplied to liquid 19 by any well-known heating means such as an internal steam coil, an externally electrically heated coil, an internal "immersion type" electric heater, a thermosiphon-arm, or the like, not shown. Boiling pressure of liquid 19 may be maintained by an inert gas such as air or nitrogen from line 21 communicating with the boiling liquid through line 22, condenser 23, and line 24, at any predetermined inert gas pressure, measured by gauge 20. Condenser 23, usually a water-cooled condenser, cools and condenses vapors liberated from the boiling liquid 19 and is disposed so as to cause condensate thus formed to flow back into chamber 14. Operating in this manner, a boiling temperature over a wide range may be selected, and catalyst tubes 17 may be uniformly heated, while maintaining a high ratio of heat transfer surface to catalyst volume in chamber 14 and preventing uneven removal of exothermic reaction heat from tubes 17.

Vaporous mercaptan-oxygen mixture from header 16 is passed through catalyst tubes 17 at a space velocity of from 0.25 to 1.0 volume per catalyst volume per hour, based on liquid volume of mercaptan. Tertiary-butyl mercaptan is catalytically oxidized to di-tertiary-butyl disulfide as a chief oxidation product in catalyst tubes 17 at a temperature in the preferred range of 275 to 350° F., together with relatively small quantities of di-teritary-butyl trisulfide and higher molecular weight sulfides. Effluent from the catalyst tubes 17 in chamber 14 is passed through line 26, condenser 27 and line 28 into accumulator 29. Condensate formed in condenser 27 comprises a liquid product phase and a water by-product phase and is collected in accumulator 29 as product layer 31 and water layer 32. Uncondensed gas from line 28 is collected in the upper portion of accumulator 29. This uncondensed gas consists primarily of hydrogen sulfide together with any inert diluent such as nitrogen, occurring in the oxygen from line 9, and some isobutylene. Uncondensed gas is passed from zone 29 through line 33 into gas product separation means 34 comprising equipment suitable for separating and recovering hydrogen sulfide and other gases in the gas admitted from line 33, such as condensers, coolers, distillation equipment, solvent extraction equipment and the like, well known to those skilled in the art, not individually illustrated herein. From zone 34 hydrogen sulfide is withdrawn through line 36, isobutylene is withdrawn through line 35, and other inert gases are withdrawn through line 40.

Water phase 32 is withdrawn from accumulator 29 through line 30. Liquid product phase 31 in zone 29 comprises di-tertiary-butyl disulfide with small amounts of di-tertiary-butyl trisulfide, and higher molecular weight sulfides, together with unreacted tertiary-butyl mercaptan and small amounts of isobutylene polymer and any dissolved isobutylene. This liquid product is passed from accumulator 29 through line 37 to liquid product separation and recovery means 38 comprising distillation equipment, condensers, coolers, and the like, not individually illustrated, which are well known to those skilled in the art, and which are suitable for separation and recovery of the individual components in the liquid from line 37. Unreacted tertiary-butyl mercaptan is withdrawn from zone 38 through lines 39 and 41, or recycled from line 39 through line 42 to line 10 for reaction in zone 14. Di-tertiary-butyl disulfide is withdrawn from zone 38 through line 43 as a product of the process, and isobutylene and isobutylene polymer are withdrawn respectively through lines 44 and 46. Higher molecular weight tertiary-butyl sulfides are withdrawn through line 47.

Our novel catalysts are selected natural occurring bauxities activated before use by heat treatment at temperatures above about 500° F., generally not higher than about 800° F. A preferred catalyst of our invention is a beauxite known by the trade name "Florite", a typical analysis of which is, on a weight basis, $Al_2O_3$, 67 per cent; $Fe_2O_3$, 12 per cent; $SiO_2$, 6 per cent; $TiO_2$, 3 per cent; ignition loss at 1800° F., 10–12 per cent. Other bauxites varying in composition from our preferred Florite catalyst, as indicated below, may be utilized in the process of our invention, and are entirely within its scope.

| Bauxite Component | Range of Weight Per Cent Concentration |
|---|---|
| $Al_2O_3$ | 50 –70 |
| $Fe_2O_3$ | 8 –20 |
| $SiO_2$ | 2 – 8 |
| $TiO_2$ | 0.5– 5 |
| Ignition Loss at 1,800° F | 2 –30 |

Operating our process in the manner above illustrated, yields of di-tertiary-butyl disulfide within the range of 5 to 30 per cent per pass and higher may be obtained, based on the mercaptan charged, while effecting a mercaptan conversion often within the range of 30 to 50 per cent.

For convenience and clarity certain apparatus such as pumps, surge tanks, accumulators, valves, etc. have not been shown in the drawing. Obviously such modifications of the present invention may be practiced without departing from the scope of the invention.

It is to be understood that when utilizing our novel catalysts, significant yields of alkyl sulfide product are obtained in any case, but that we have found that we obtain higher yields of desired sulfide products, i. e., the disulfide, when we prevent the development of unduly high reaction temperatures.

Our invention is illustrated by the following examples. The reactants, their proportions, and other specific ingredients are presented as being typical, and should not be construed to limit the invention unduly.

*Example 1*

Tertiary-butyl mercaptan was pumped by means of a proportionating pump into a preheater vessel at the rate of 3.0 pounds per hour in admixture with air metered at the rate of 13.3 cubic feet per hour (CFH). The mercaptan-air admixture was completely mixed and heated in the preheat furnace to a temperature of 350° F. From the preheater, the mixed mercaptan-air stream was passed into a reaction chamber consisting of a tube sheet fitted with a number of catalyst packed ¾ inch steel pipe hairpin tubes in series, positioned in a water jacket in contact with water as a heat transfer medium. The jacket was equiped with an externally disposed electrically heated resistance coil, a water vapor condenser and an inlet for nitrogen gas for controlling pressure of heated boiling liquid. The reactor was thus equipped to heat water to boiling over a broad range of pressure to provide a wide choice of operating temperatures. The catalyst comprised our preferred activated Florite catalyst, described earlier in the specification. The tube sheet was connected with the preheated air-mercaptan inlet conduit so that the feed entered the catalyst tube series at one end and traversed its entire length before being withdrawn. The oxygen-mercaptan feed was passed through the catalyst tubes at a space velocity of 1.0 volume per catalyst volume per hour, based on liquid volumes of tertiary-butyl mercaptan. The temperature of the boiling water heat transfer medium was closely controlled by regulating the boiling pressure during the entire run. Total effluent from the catalyst tube was passed through a water condenser into an accumulator. Liquid product from the accumulator was stripped free of unreacted mercaptan and the mercaptan-free liquid product analyzed. The duration of the run was 100 hours and the broadest range of water boiling temperatures during that period was 300 to 360° F., the temperature during the last 50 hours being from 340 to 360° F.

No difficulty was experienced in maintaining temperature control.

The following tabulation summarizes the pertinent conversion and product data obtained from this run.

|  | Weight, Lbs. | Weight Per Cent |
|---|---|---|
| Tertiary-butyl mercaptan feed | 298 |  |
| Tertiary-butyl mercaptan recovered | 182.5 |  |
| Tertiary-butyl mercaptan converted | 115.5 | 38.8 |
| Di-tertiary-butyl disulfide recovered | 47 | [1] 40.7 |
| Di-tertiary-butyl trisulfide recovered | 24.8 | [1] 21.4 |
| Heavier sulfides recovered | 8.2 | [1] 7.1 |
| Tertiary-butyl mercaptan decomposition product recovered | 35.5 | [2] 30.8 |

[1] Based on mercaptan conversion.
[2] Based on mercaptan converted and comprising hydrogen sulfide plus isobutylene plus isobutylene polymer.

*Example 2*

Another run was made using the same equipment, as used in the run of Example 1 and in accordance with the same procedure, employing the same catalyst. The duration of this run was 69 hours. Tertiary-butyl mercaptan was introduced into the preheater at the rate of 3.3 pounds per hour in admixture with air introduced at the rate of 14.6 CFH. The water heat transfer medium was maintained at boiling temperatures over the range of from 310 to 380° F. during the entire run, the boiling temperature during the first 48 hours being 330 to 335° F. The space velocity of the mercaptan-air admixtures was 1.0 volume per catalyst volume per hour, based on liquid volumes of mercaptan.

The following tabulation summarizes the pertinent conversion and product data obtained from this run.

|  | Weight, Lbs. | Weight Per Cent |
|---|---|---|
| Tertiary-butyl mercaptan fed | 231 |  |
| Tertiary-butyl mercaptan recovered | 161.5 |  |
| Tertiary-butyl mercaptan converted | 69.5 | 30.1 |
| Di-tertiary-butyl disulfide recovered | 24.9 | [1] 35.8 |
| Di-tertiary-butyl trisulfide recovered | 17.1 | [1] 24.6 |
| Heavier sulfides recovered | 4.4 | [1] 6.3 |
| Tertiary-butyl mercaptan decomposition product | 22.5 | [2] 32.4 |

[1] Based on tertiary-butyl mercaptan converted.
[2] Based on tertiary-butyl mercaptan converted and comprising hydrogen sulfide isobutylene and isobutylene polymer.

*Example 3*

Tertiary-butyl mercaptan feed stock was preheated together with air and the preheated admixture was passed into an electrically heated gas reaction tube containing about 120 ml. of an activated bauxite as a catalyst. The activated bauxite had the following approximate composition: $Al_2O_3$ 78 per cent, $Fe_2O_3$ 3 per cent, $SiO_2$ 14 per cent, and $TiO_2$ 5 per cent. The reaction was conducted at a temperature in the range of 180 to 250° F. Total effluent from the catalyst zone was passed through a water cooled condenser and partially condensed. Extensive mercaptan conversion took place. However, the liquid condensate product was comprised predominantly of olefins produced by mercaptan decomposition, and polymer formed from the olefin decomposition product. No oxidation of mercaptan to sulfide product was observed.

*Example 4*

A series of runs was made in a jacketed catalyst tube of 4 liter catalyst activity, in which tertiary-butyl mercaptan was oxidized to di-tertiary-butyl disulfide in the presence of our preferred Florite catalyst, at a temperature in the range of 150–425° F. Catalyst of 5 to 10 mesh was employed, and tertiary-butyl mercaptan was charged to the catalyst zone at a space velocity of 0.5 volume per catalyst volume per hour, based on liquid volumes of mercaptan. Air was charged in a mole ratio to mercaptan of about 0.2:1.

The catalyst tube was constructed of 4 inch pipe and the catalyst bed was 34 inches in length, traversed its entire length by a thermocouple well. The jacket was connected to steam and water lines in such a way that either high or low pressure steam or water could be passed through it. The mercaptan reactant was vaporized in a steam jacket preheater and mixed with preheated air, just prior to entering the catalyst bed. Flow over the catalyst was downward. Effluent from the catalyst bed was passed through a water condenser, and through a back pressure regulated valve operated by an air operated level motor of conventional design. Liquid product was collected, and uncondensed gases were vented.

Temperature control was nearly impossible during these runs owing to the thickness (4 inches) of the catalyst bed. As long as the conversion to disulfide was held in the range of from 4 to 8 per cent, the reaction temperature was controlled in a satisfactory manner. However, as soon as any change in reaction conditions was made which tended to increase the conversion significantly, a hot spot would form at the top of the catalyst bed, and slowly progress downward. Under these poorly controlled temperature conditions, much hydrogen sulfide was formed as decomposition product, together with a high proportion of high molecular weight sulfides and olefin polymer, and correspondingly decreased yields of sulfide product were attained. The threshold temperature did not appear to be constant or characteristic; once a hot spot developed in a catalyst the reaction became uncontrollable and after the hot spot traveled completely through the catalyst the activity of the catalyst was quite low. The catalyst activity, however, was readily restored by treating the catalyst with air at an elevated temperature.

Conversions were erratic due to the temperature control difficulties above described and to the concomitant deactivation of the catalyst. The data obtained from this series of runs, very definitely demonstrate the need for careful temperature control in the catalyst bed, such as that illustrated in the specification. As has already been discussed, this problem is solved by the use of a liquid heat transfer medium in the reaction zone as illustrated by the figure, and demonstrated by Examples 1 and 2.

We have presented our invention to a large extent in terms of a vapor phase reaction. However, it is to be understood that our invention is also applicable to liquid phase operation. Elevated pressures would favor the oxidation reaction and retard the decomposition of the mercaptan to hydrogen sulfide and olefins.

Throughout this specification and claims the term "alkyl sulfide" designates any compound of the formula $RS_nR$ wherein R is an alkyl radical and $n$ is any whole number greater than one.

As will be evident to those skilled in the art, various modifications of this invention can be made, or followed, in the light of the foregoing disclosure and discussion, without departing from the spirit or scope of the disclosure or from the scope of the claims.

We claim:

1. A process for the manufacture of a di-tertiary alkyl sulfide from a tertiary alkyl mercaptan containing not more than 6 carbon atoms per molecule, comprising reacting such a mercaptan with oxygen in the presence of an activated naturally occurring bauxite, as a catalyst, containing on a weight basis from 50 to 70 per cent $Al_2O_3$, from 8 to 20 per cent $Fe_2O_3$, from 2 to 8 per cent $SiO_2$, from 0.5 to 5 per cent $TiO_2$, and from 2 to 30 per cent volatile matter as determined by ignition at 1800° F., at a temperature in the range of 150–450° F., and recovering a di-tertiary alkyl sulfide from the resulting reaction product.

2. The process of claim 1 wherein said temperature is within the range of from 275 to 350° F.

3. A continuous process for the manufacture of a di-tertiary alkyl sulfide from a tertiary alkyl mercaptan containing not more than 6 carbon atoms per molecule, comprising introducing such a tertiary alkyl mercaptan into a catalyst zone together with an oxygen-containing gas in a mole ratio of oxygen to said mercaptan within the limits of 0.06:1 to 0.25:1 in contact with a catalyst comprising an activated naturally occurring bauxite, containing on a weight basis from 50 to 70 per cent $Al_2O_3$, from 8 to 20 per cent $Fe_2O_3$, from 2 to 8 per cent $SiO_2$, from 0.5 to 5 per cent $TiO_2$, and from 2 to 30 per cent volatile matter as determined by ignition at 1800° F., and at a space velocity within the limits of 0.25 and 1.0 based on liquid volumes mercaptan per volume of catalyst per hour, and in said catalyst zone reacting said mercaptan with said oxygen in the vapor phase at a temperature within the range of 275 to 350° F.; and recovering a di-tertiary alkyl sulfide from the resulting reaction mixture as a product of the process.

4. A continuous process for the manufacture of a di-tertiary alkyl sulfide from a tertiary alkyl mercaptan containing not more than 6 carbon atoms per molecule, comprising introducing such a tertiary alkyl mercaptan into a catalyst zone together with an oxygen-containing gas in a mole ratio of oxygen to said mercaptan within the limits of 0.06:1 to 0.25:1 in contact with a naturally occurring bauxite activated by heat treatment at a temperature of at least 500° F. and not higher than 800° F. and containing on a weight basis from 50 to 70 per cent $Al_2O_3$, from 8 to 20 per cent $Fe_2O_3$, from 2 to 8 per cent $SiO_2$, from 0.5 to 5 per cent $TiO_2$, and from 2 to 30 per cent volatile matter as determined by ignition at 1800° F., at a space velocity within the limits of 0.25 to 1.0 based on liquid volumes mercaptan per volume of catalyst per hour, and in said catalyst zone reacting said mercaptan with said oxygen in the vapor phase at a temperature within the range of 275 to 350° F.; and recovering a di-tertiary alkyl sulfide from the resulting reaction mixture as a product of the process.

5. The process of claim 3 wherein said catalyst comprises, on a weight basis, 67 per cent $Al_2O_3$, 12 per cent $Fe_2O_3$, 6 per cent $SiO_2$, 3 per cent $TiO_2$, and 12 per cent volatile matter as measured at 1800° F.

6. The process of claim 3 wherein said mercaptan is tertiary butyl mercaptan and said di-tertiary alkyl sulfide is di-tertiary-butyl disulfide.

7. A continuous process for the manufacture of di-tertiary-butyl disulfide comprising introducing tertiary-butyl mercaptan in admixture with oxygen of at least 90 per cent oxygen purity in a mole ratio of oxygen to mercaptan within the limits of 0.06:1 to 0.25:1 into a preheating zone and therein heating said admixture to a temperature within the limits of 275 to 350° F. and vaporizing same, passing vaporous preheated mercaptan-oxygen mixture from said preheater into a reaction zone containing a granular naturally occurring bauxite previously activated by heat treatment at a temperature of at least 500° F. and not higher than 800° F. and containing on a weight basis from 50 to 70 per cent $Al_2O_3$, from 8 to 20 per cent $Fe_2O_3$, from 2 to 8 per cent $SiO_2$, from 0.5 to 5 per cent $TiO_2$, and from 2 to 30 per cent volatile matter as determined by ignition at 1800° F., at a space velocity within the range of 0.25 to 1.0 based on liquid volumes of mercaptan per catalyst volume per hour, said reaction zone containing said catalyst disposed in a plurality of columns, maintaining said catalyst in indirect heat exchange relation with a liquid heat transfer medium boiling at a temperature to maintain the temperature of said mercaptan-oxygen reactants at a level not lower than 275° F. and not higher than 350° F., passing total effluent from said catalyst zone and partially condensing same, passing resulting condensate into a product separation means and therein separating unreacted mercaptan from said condensate, separating di-tertiary-butyl disulfide from said condensate, and recovering said di-tertiary-butyl disulfide as a product of the process.

8. The process of claim 7 wherein unreacted mercaptan separated in said separating means is recycled to said preheating zone.

9. The process of claim 6 wherein said oxygen-containing gas is air.

CLYDE W. MERTZ.
HASKELL W. CUTCHER.
JOHN A. McBRIDE.

REFERENCES CITED

The following references are of record in the file of this patent:

UNITED STATES PATENTS

| Number | Name | Date |
| --- | --- | --- |
| 2,001,715 | Fisher | May 21, 1935 |
| 2,028,303 | Turner | Jan. 21, 1936 |
| 2,085,527 | Gregory | June 29, 1937 |
| 2,319,738 | Jones | May 18, 1943 |
| 2,421,545 | Crouch | June 3, 1947 |